UNITED STATES PATENT OFFICE.

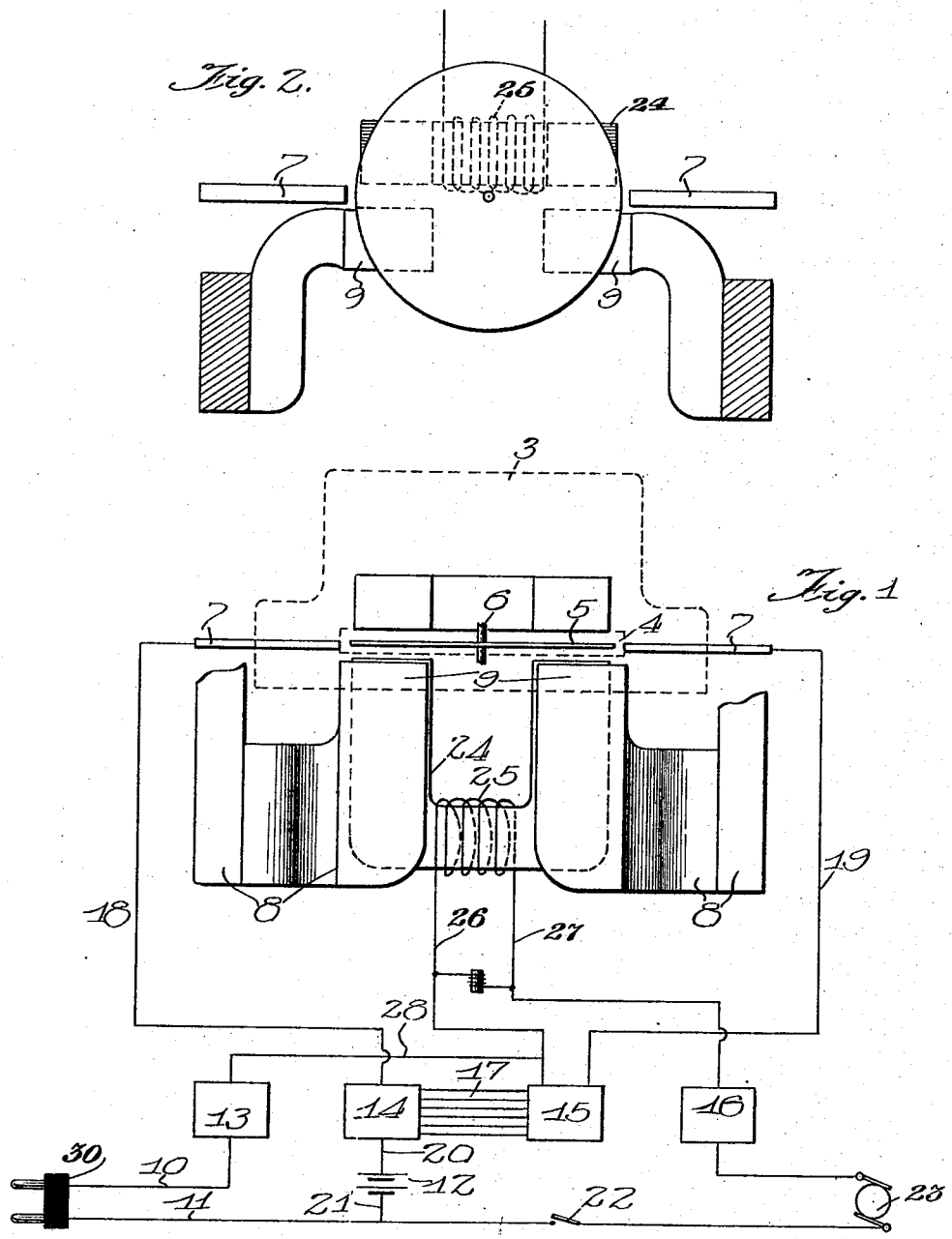

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

AMPERE-HOUR METER.

1,190,304. Specification of Letters Patent. Patented July 11, 1916.

Application filed November 16, 1911. Serial No. 660,629.

*To all whom it may concern:*

Be it known that I, ROBERT C. LANPHIER, a citizen of the United States, residing at Springfield, in the county of Sangamon and State of Illinois, have invented a new and useful Improvement in Ampere-Hour Meters, of which the following is a specification, reference being had to the accompanying drawings.

My invention relates primarily to improvements in ampere hour meters, and particularly to new and improved ampere hour meters designed to be used in connection with storage batteries, and more particularly still to improvements to be used in ampere hour meters in connection with storage batteries upon the discharge thereof.

As is well-known in the art, ampere-hour meters are generally used with storage batteries, both upon the charging and the discharging of the same, for the purpose of indicating on the charge when the battery is completely charged and for the purpose of indicating on the discharge of the battery when that discharge has reached a point at which it is necessary to recharge the battery. Ampere-hour meters, however, as used in connection with a storage battery, particularly upon the discharge thereof, have met with certain difficulties and objections. As is well known, the so-called "lead" storage battery—that is, the type of storage battery using lead plates with sulfuric acid for the electrolyte—has an effective or useful capacity on discharge which varies a great deal with the rate at which the current is drawn from the battery. For instance, when the battery is discharging at a normal discharge rate—say, at twenty-seven amperes for five hours—a total of one hundred and thirty-five ampere hours is obtained from the battery. If the battery is run at a lower rate—say, fifteen or sixteen amperes for nine hours—only a little more is obtained, say, a maximum of one hundred and forty-five hours, in the case of the same battery. On the other hand, if the discharge of the battery is at a very high rate —that is, a high rate above normal, say, fifty amperes on the same battery—there results an available capacity of less than one hundred ampere hours because of the effect of the high rate of current flow on the active material in the plates. This is due to the fact that at a high rate of discharge the outer part of the active material in the plates of the battery tends to give up its charge by a change in its chemical condition, which, at the same time, prevents the electrolyte getting back into the material behind as effectively as it does at a low discharge rate. Of course, theoretically, the output in ampere hours from a lead battery should be about the same at all rates. The fall in specific gravity of the electrolyte is always directly proportional to the actual number of ampere hours taken out, so that if a battery has been discharged at a very high rate and there has been obtained perhaps only one-half of its maximum capacity in ampere hours, the voltage drops so low that it is practically useless, but, on the other hand, the specific gravity will have been reduced from a maximum to a point considerably higher than it would have dropped if the entire capacity had been taken out at normal rate. The actual discharge in ampere hours, therefore, is really proportional to the drop in specific gravity, and there is electricity still available in a battery, after it has been worked at a very high rate, after the voltage has dropped so low that it is no longer available commercially. Therefore, I speak, in this specification, of the "effective" ampere hours capacity as distinguished from the actual "ampere hours" capacity. In vehicle service, when the user wishes to be sure of not being stalled on the road in his car, it is necessary that he should know the effective or useful ampere hours still available in his battery at any time, and not the actual capacity still in the battery, which, as explained above, if he has used it at a rate greatly in excess of the normal rate, will have to be taken out at such a low rate that it will not propel the car properly.

It is the object of my invention to provide a method of indicating the effective capacity of a storage battery having an ampere hour meter connected therewith, by which the meter will indicate the effective ampere hour capacity of the battery, regardless of the rate at which the current has been withdrawn from the battery; also to provide a new and improved ampere hour meter adapted to record the discharge of a storage battery in such a way as to approximately correctly indicate to the user when the effective capacity of the battery has been reduced to a point where recharging is necessary or advisable.

In the drawings I have shown a new and improved meter showing one form of apparatus by which my process can be carried out.

In the drawings,—Figure 1 is a side elevation showing my improvements diagrammatically; and Fig. 2 is a top or plan view of the essential features of the parts shown in Fig. 1.

Referring to the figures,—3 indicates, in dotted lines, the ordinary casing of a mercury ampere-hour meter containing a disk chamber 4. The casing may, of course, be of any approved form and is only indicated in the drawings.

5 indicates a disk armature of the usual type, which is mounted upon a shaft 6, shown as broken away in the usual manner. The disk revolves within the chamber 4 in the well-known manner.

7 indicates contacts, which are adapted to be connected with a circuit, as hereinafter described, and which, in the well-known manner, conduct the current into the mercury in the chamber 4 and across the disk.

8 indicates an energizing magnet, which is preferably a permanent magnet and whose pole-pieces 9 extend into the casing 3 in operative relation with the disk. The magnet 8 is shown as broken away and may be of any approved form. As is best shown in Fig. 2, the pole-pieces 9 are so located that they will be slightly to one side of the central line of the disk and the central line of the current between the contacts 7.

10—11 indicate circuit wires, which are adapted, on the charging of the battery, to be connected with any suitable generator.

12 indicates diagrammatically a storage battery.

13—14—15—16 indicate connecting devices for the circuits and parts hereinafter described.

17 indicates a shunt of the usual form and type extending between blocks 14 and 15.

18 indicates a circuit wire, which runs from block 14 to one of the contacts 7, and 19 indicates another circuit wire which connects the other contact with block 15. The storage battery 12 is adapted to be connected by wire 20 with the block 14 and by wire 21 with the circuit wire 11.

22 indicates a switch in circuit wire 11 of any well-known type.

23 indicates diagrammatically any suitable translating device, as a motor or otherwise.

24 indicates the U-shaped core of an electro-magnet, which is mounted in any suitable way in the casing with its pole-pieces extending to the chamber in operative relation with the disk, and, as is best shown in Fig. 2, slightly to one side of the center line of said disk between the contacts 7 and upon the opposite side thereof from the pole-pieces 9. 25 indicates an energizing winding for said core, which, by means of wires 26—27, is connected, respectively, with blocks 15 and 16 so that the said windings are in series with the load or a fractional portion thereof. This electro-magnet constitutes an auxiliary motor element which, as hereinafter described, is operative to drive or assist in driving the armature disk only when the battery is discharging, said magnet being deenergized while the battery is being charged.

28 indicates a wire, which connects block 13 with circuit wire 26.

The operation of the above-described device is as follows: When the battery is being charged the current will flow from the wire 10 through the block 13 and wire 28, to block 15, where it will divide, a portion going through shunt 17 to block 14, while the balance will pass through wire 19 to contact 7, across the disk in the mercury chamber 4, out by the other contact wire 18, and back to block 14, the entire current then passing on through wire 20 to the battery. Thus the meter will be operated as the battery is charged in the well-known way, so that it will indicate when the battery has received its maximum charge. The switch 22 will at this time be open and therefore no current will pass through the windings 25, and consequently the core 24 will not be energized and will have no driving effect on the disk. It will be understood that when a device of this character is installed in a motor vehicle, a charging receptacle is provided, so that the current from the generator can be plugged in through it. Such a charging receptacle is indicated on Fig. 1 of the drawings and marked 30. This is of any well-known character and of course contains a switch of some approved form.

When it is desired to use the battery current, the switch 22 is closed. The current from the battery will thereupon pass into the block 14 where it will divide, a portion passing through the shunt 17 to block 15, thence through wire 26, energizing the winding 25, and thence by wire 27 to block 16, to the translating devices 23, and thence back by wire 11 to the battery. A portion of the current will also be led from block 14 through wire 18 and contact 7 across the disk 5, and then out through the other contact 7 and by wire 19 to block 15.

The current thus passing in an opposite direction from what it passes on the charge of the battery, the disk will be rotated in the opposite direction so as to move properly to indicate the discharge of the battery. In this case both fields will act as energizing fields upon the disk. As the fields from the magnet poles 9 are permanent or constant, their effect in driving the disk will be directly proportional to the value of the current. On the other hand, inasmuch as the core 24 of the auxiliary magnet is energized by windings which are in series with the load, the strength of the magnetic field of said magnet will vary in proportion to the load, and as it interacts with the current which itself varies in strength, the driving force of the electromagnet taken by itself will be as the square of the load, because both the field and the current increase at the same time and at the same rate. The meter, therefore, will be driven at a speed in excess of the proper speed to record true ampere hours, and I have found by experiment that within any limits likely to arise in any ordinary use of a vehicle the speed thus given to the meter in excess of the correct speed will be substantially the same as the reduction in the effective capacity as distinguished from the theoretical capacity of the battery, caused by operating the battery at higher than normal speed, as it will be obvious that the speed of the meter will increase at a rapidly increasing rate in accordance with the rate of discharge of the battery. I have found, for instance, by tests, taking twenty-seven amperes as the normal discharge rate and calibrating the meter so as to run correctly at that load on discharge, that when the battery was discharged at the rate of sixty amperes the meter was about fifty-four per cent. fast instead of being theoretically correct. I have also found that with the same battery the battery had only about sixty per cent. as much capacity in effective ampere hours at a sixty ampere discharge rate as it had at the twenty-seven ampere hour rate. I have found, therefore, that with the meter being speeded up by a percentage which is substantially equal to the reciprocal of the reduction in capacity of the battery, the dial hand would reach exactly the same point on the dial for one hundred ampere hours taken out at the high rate as for one hundred and fifty-four ampere hours taken out at the normal rate. By the same experiments I have found that with a battery having twenty-seven amperes as the normal discharge rate, by my new and improved process and with a meter of the type above described the curve showed that up to sixty amperes this process and apparatus compensated almost exactly. As a battery in vehicle work or for similar purposes is very seldom discharged at more than double normal rate for any extended period, it will be seen that the error at very much higher discharge rates,—due to the compensation obtained by the meter not being sufficient for the falling off in effective capacity,—will be of no practical importance. Discharges at three times normal or more, will seldom last for more than a few minutes in actual practice.

I have shown only the ordinary shunt in the apparatus above described. It will be understood, however, that any approved form of differential shunt may be used by which the meter may be caused to operate under any normal conditions on discharge at a rate slightly faster than on charge in order to compensate for the inefficiency of the battery. Such a shunt, for instance, I have shown in my Letters Patent, No. 958,508, dated May 17, 1910. Such features, however, have nothing to do with my present invention, and therefore I do not go into them in detail here, as they will be readily understood,—one essential feature, so far as the apparatus is concerned, being that the connection shall be such that the auxiliary electro-magnet shall not be energized on charge of the battery but shall be energized on the discharge. It will, of course, also be understood that my apparatus is mounted in a suitable frame and casing, which may be of any well-known kind and are well understood and therefore need no description here. I have, therefore, illustrated the apparatus diagrammatically in order not to encumber the drawings with unnecessary details and make the specification unnecessarily prolix.

That which I claim as my invention, and desire to secure by Letters Patent, is,—

1. The method of indicating the effective capacity of a storage battery having an ampere hour meter connected therewith so as to operate on charge and on discharge of the battery, which consists in operating the meter on charge at a rate which is substantially directly proportional to the value of the current supplied to the battery, and operating the meter on discharge at an accelerated rate by electro-magnetically supplementing the normal armature-operating effect of the motor element of the meter by an auxiliary motor element energized by the battery current, the effect of which varies substantially as the square of the value of the current withdrawn from the battery.

2. The combination with an electric meter, comprising a rotary armature, and a permanent magnet adapted by the passage of a current through said armature to cause said armature to rotate in one direction or the other, depending on the direction of flow of the current, of electro-magnetic means acting on the armature and adapted to be energized by flow of the current in one direction only, for varying the rate of rotation of the armature in one direction under a given flow of current, as compared with its rate of rotation in the opposite direction under a corresponding current flow.

3. The combination with an electric meter, comprising a rotary armature, and a permanent magnet adapted by the passage of a current through said armature in one direction or another to cause said armature to rotate in either direction at the same rate, depending on the direction of flow of the current, of means acting upon said armature only when the current flows in one direction to abnormally vary the rate of rotation of the armature.

4. The combination with an electric meter, comprising a rotary armature, and a permanent magnet adapted by the passage of a current through said armature in one direction or another to cause said armature to rotate in either direction at the same rate, depending on the direction of flow of the current, of an electro-magnet adapted to act upon the armature only when the current flows in one direction to vary from the normal its rate of rotation.

5. The combination with an electric meter, comprising a rotary armature, and a permanent magnet adapted to operate upon said armature by the flow of current therethrough in one direction or another to cause the armature to rotate in either direction, depending on the direction of flow of the current, of a storage battery, and auxiliary motor mechanism controlled by the flow of current from the battery only for increasing the rate of rotation of the armature by an amount that varies substantially as the square of the load.

6. The combination with an electric meter, comprising a rotary armature, and a permanent magnet adapted to operate upon said armature by the flow of current therethrough in one direction or another to cause the armature to rotate in either direction depending on the direction of flow of the current, of a storage battery, and auxiliary motor mechanism controlled by the flow of current from the battery only for increasing the rate of rotation of the armature on discharge of the battery at rates above normal to an extent substantially equal to the difference between the normal ampere hour capacity and the effective capacity of the battery at such discharge rates.

7. The combination with an ampere hour meter, comprising a rotary armature, and a permanent magnet adapted by the passage of an electric current through the armature in one direction or another to cause the same to rotate in either direction, depending on the direction of flow of the current, of auxiliary means adapted to coöperate with said magnet only when the current flows in one direction to vary the rate of rotation of the armature from the normal.

8. The combination with an ampere hour meter, comprising a rotary armature, and a permanent magnet adapted by the passage of an electric current through the armature in one direction or another to cause the same to rotate in either direction, depending on the direction of flow of the current, of an electro-magnet, and means for energizing said electro-magnet only when the current flows in one direction so that it will coöperate with said first-mentioned magnet to drive the armature.

9. The combination with an ampere hour meter, comprising a rotary armature, and a permanent magnet adapted by the passage of an electric current through the armature in one direction or another to cause the same to rotate in either direction, depending on the direction of flow of the current, of a storage battery, and an electro-magnet adapted to be energized by the battery current on discharge only, said electro-magnet coöperating with said first-mentioned magnet to rotate the armature.

10. The combination of a storage battery, an ampere hour meter comprising an armature, and an energizing permanent magnet therefor, said armature being arranged to rotate in one direction on charge of the battery and in the opposite direction on discharge thereof, and auxiliary motor mechanism for increasing the rate of rotation of the armature for a given load on discharge of the battery.

11. The combination of a storage battery, an ampere hour meter comprising an armature, and an energizing permanent magnet therefor, said armature being arranged to rotate in one direction on charge of the battery and in the opposite direction on discharge thereof, and auxiliary motor mechanism for increasing the rate of rotation of the armature for a given load on discharge of the battery by an amount that varies substantially as the square of the load.

12. The combination of a storage battery, an ampere hour meter adapted to record both the charge and the discharge thereof, said meter comprising an armature and an energizing permanent magnet, contacts adapted to be connected in circuit with said battery when said battery is being charged, and adapted to carry the load current or a fractional portion thereof when said battery is discharging, an electro-magnet in operative relation with said armature and having a winding, and means whereby said winding may be connected in series with the load only when said battery is discharging, said electro-magnet being inoperative when the battery is being charged.

13. The combination of a mercury chamber, an armature adapted to rotate in said chamber, a permanent magnet in operative relation to said armature, said armature being adapted to rotate in one direction or another, depending on the direction of flow of the current through said chamber, an electro-magnet in operative relation to said armature, and means whereby the electro-magnet is energized when the current flows in one direction through said chamber and said electro-magnet is rendered inoperative when the current flows in the opposite direction.

14. The combination of a storage battery, an ampere hour meter adapted to record both the charge and the discharge thereof, said meter comprising a chamber adapted to contain mercury, a rotatable armature in said chamber, and a permanent energizing magnet, contacts leading into said chamber and adapted to be connected in circuit with said battery on the charge thereof and in circuit with the load when the battery is being discharged, an electro-magnet in operative relation with said armature, and having a winding, and means whereby said winding may be connected in series with the load only when said battery is being discharged, said electro-magnet being inoperative when the battery is being charged.

15. The combination of a storage battery, an ampere hour meter adapted to record the discharge thereof, said meter comprising an armature and a permanent energizing magnet therefor, contacts adapted to be connected in circuit with the load, an electro-magnet in operative relation with said armature and having a winding and means for connecting said electro-magnet in series with the load when the battery is discharging, and for rendering said electro-magnet inoperative when the battery is being charged.

ROBERT C. LANPHIER.

Witnesses:
CHAS. G. LANPHIER,
MILDRED FUNK.

Copies of this patent may be obtained for five cents each, by addressing the "Commissioner of Patents, Washington, D. C."